June 7, 1927.
O. E. HUNT
VEHICLE
Filed March 22, 1923
1,631,206
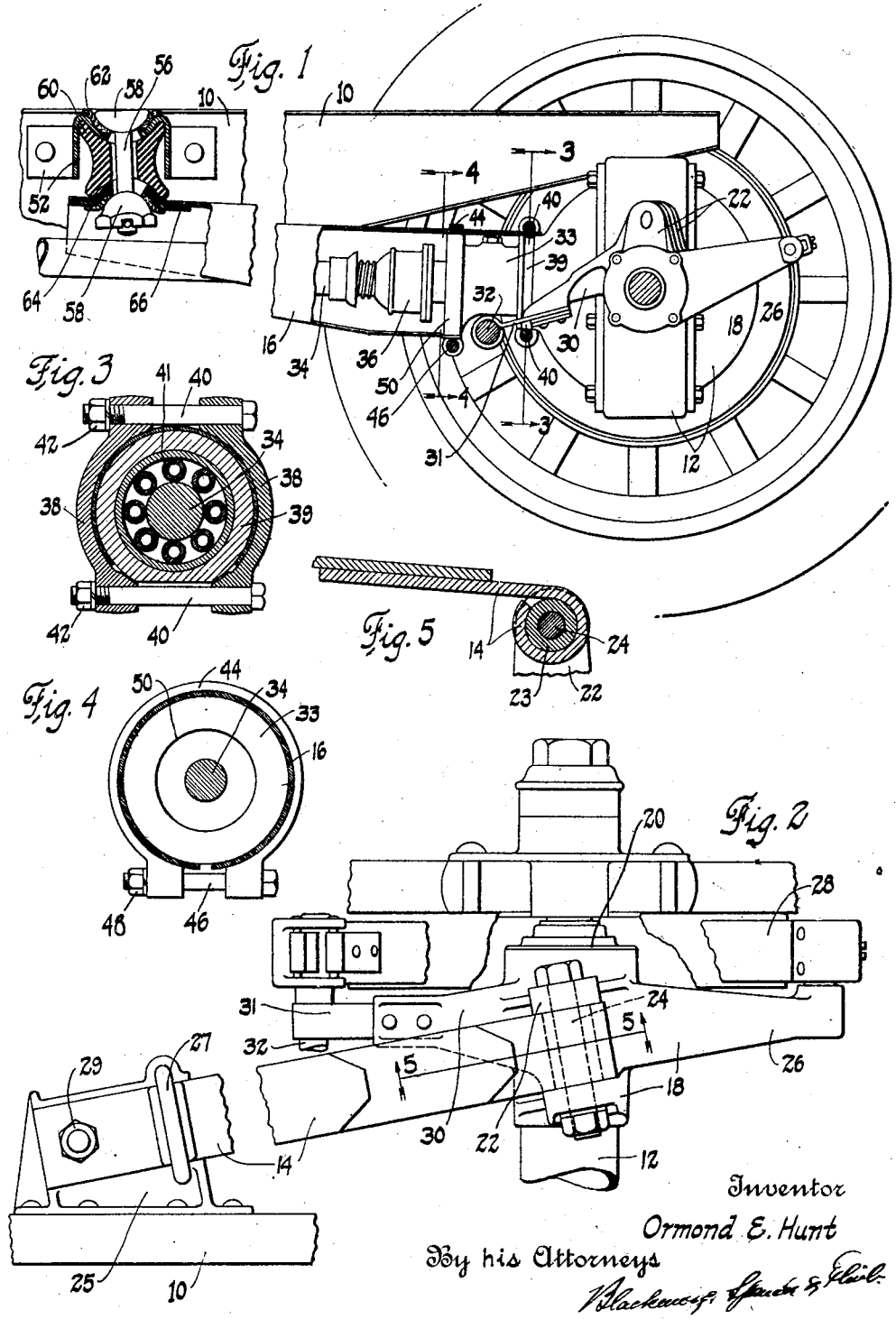
Inventor
Ormond E. Hunt
By his Attorneys Patented June 7, 1927.

1,631,206

UNITED STATES PATENT OFFICE.

ORMOND E. HUNT, OF DETROIT, MICHIGAN, ASSIGNOR TO GENERAL MOTORS CORPORATION, OF DETROIT, MICHIGAN, A CORPORATION OF DELAWARE.

VEHICLE.

Application filed March 22, 1923. Serial No. 626,897.

This invention relates to vehicles, and is illustrated as embodied in an automobile. An object of the invention is to improve the connections between the rear axle casing and the chassis frame to provide strong and light connections, which can readily and inexpensively be manufactured and assembled.

According to one feature of the invention, these connections include a torque arm connected at one end to the rear axle casing and at the other end yieldingly and preferably universally connected to the frame, as for example by a staybolt having semi-spherical heads seated in semi-spherical seats in the frame and the torque arm, together with a resilient spacing member (e. g. a rubber washer) between the frame and torque arm. In order that the torque arm may be light and yet very strong, it is made in tubular form of sheet metal, and an important minor feature of the invention relates to providing a secure fastening for an arm of this character by utilizing an encircling clamp drawing a grooved part of the arm into a groove formed in a boss on the differential housing.

The invention also contemplates strengthening the connections, and resisting torque on the casing, by providing a pair of unitary devices having portions serving as brake-supporting brackets, and preferably also having sleeves surrounding and secured to opposite ends of the axle casing, which devices are formed to be attached to the ends of quarter-elliptic springs which are secured to the chassis frame.

The above and other objects and features of the invention, including various novel combinations and desirable particular construction, will be apparent from the following description of the illustrative embodiment of the invention shown in the accompanying drawings, in which:

Figure 1 is a view, broken away and partly in side elevation and partly in section, showing the torque arm and axle casing, together with part of the chassis frame;

Figure 2 is a view, broken away and partly in top plan and partly in section, showing the spring connecting the end of the axle casing and the chassis frame;

Figure 3 is a section on the line 3—3 of Figure 1, showing the rear clamp for the torque arm;

Figure 4 is a section on the line 4—4 of Figure 1, showing the front clamp for the torque arm; and Figure 5 is a section on the line 5—5 of Figure 2, showing the connection between one of the above-described devices and the spring.

In the construction shown, a chassis frame 10 and rear axle casing 12, containing a differential gear and a pair of semi-floating axles, are connected by a pair of quarter-elliptic leaf springs 14 and a torque arm 16. Each spring 14 is connected at one end to the axle casing through a unitary device such as a bracket 18 having a sleeve to surround one end of the casing and to be attached by tap screws to a flange 20 of the casing. This device is connected to the chassis frame by the spring, which has an eye receiving a connecting bolt 24 passing through holes in a pair of spaced lugs 22. A bushing 23 may be provided if desired. It is to be noted that the spring is at an acute angle to the axis of the sleeve surrounding the axle casing, and that it is nearly tangential to the direction of torque in the casing, so that it strongly resists the torque. The invention, from this point of view, also contemplates forming the device 18 as a brake bracket having an arm 26 carrying the brake band 28 and an arm 30 having riveted thereto a strap 31 to support a brake-applying shaft 32. By this arrangement torque on the brake band is transmitted directly to device 18 and therefore to spring 14. The front end of each spring is attached to a bracket 25 of the chassis frame by means of a U-bolt 27 and a bolt 29 which passes through a hole in the spring and takes the drive. By arranging the spring in this manner, connected at its opposite ends to the frame and to a bracket which receives the braking torque directly, the axle casing 12 may be made much lighter, and as the torque is taken longitudinally of the spring, the spring also may be comparatively light. This arrangement also results in an efficient construction which is inexpensive to manufacture and which is readily assembled.

Centrally of the casing 12, torque is taken by the torque arm 16, which I prefer to make as a tubular member protecting propeller shaft 34 and open at its lower side to permit access to universal joint 36 during the assembling operation and to allow relative up-and-down movement of the propeller shaft with respect to the torque arm. To secure a strong joint, the torque arm is clamped to a boss 33 formed on axle casing 12, at the enlarged portion housing the differential, by two peripheral encircling clamps of which the rear one is formed of two members 38 perforated at opposite ends to receive bolts 40, nuts 42 being arranged to hold the bolts and members together. This clamp draws a groove in torque arm or tube 16 into a groove formed in the exterior of a flange 39 formed on boss 33, and the lower bolt 40 seats directly in the groove in the flange, the torque tube being cut away at the bottom. 41 indicates a roller bearing. The front clamp may be in the form of a clamp 44 and bolt 46 held by a nut 48, the clamp pressing the torque tube 16 against a flange 50 on boss 33. This arrangement provides a very strong joint in spite of the thin material of which the torque tube is made.

According to an important feature of the invention, the front end of torque arm 16 is yieldingly secured to a cross piece 52 riveted to the side members of frame 10, in such a manner as to have a limited universal movement, and preferably at a point between the ends of the propeller shaft, by a staybolt 56 having two semi-spherical heads 58 (one in the form of a removable nut), seated in corresponding semi-spherical seats or sockets in cross piece 52 and arm 16, and by a resilient spacing member such as a rubber washer 60. The washer is formed with semi-spherical recesses in its opposite side faces so as to have a limited movement with bolt 56. In order to eliminate the necessity for lubrication, a gasket or washer 62 of rubberized fabric such as "thermoid" is placed between the top head 58 and the seat in cross piece 52, and a similar gasket or washer 64 is placed between the lower head 58 and a steel reinforcement 66 at the front end of the torque tube 16. These gaskets or washers may be riveted or otherwise secured to crosspiece 52 and torque tube 16 respectively. By the described arrangement the chassis frame is cushioned against shocks from the torque tube due to the rear wheels striking obstructions.

By the combination of the improved arrangement for driving through quarter-elliptic springs, and the thin tubular torque arm or tube connected as described, a very light construction of great strength is secured. While one illustrative embodiment of my invention has been described at length, it is not my intention to limit its scope by the above description, or otherwise than by the terms of the appended claims.

I claim:

1. A torque arm, in a vehicle having a frame and a propeller shaft and a rear axle with its casing, comprising, in combination, a tubular torque member connected to the axle casing and arranged to protect the propeller shaft having relative movement with said propeller shaft, and means yieldingly and universally connecting said member to the frame.

2. A torque arm, in a vehicle having a frame and a propeller shaft and a rear axle with its casing, comprising, in combination, a tubular torque member connected to the axle casing and arranged to protect the propeller shaft, and means yieldingly and universally connecting said member to the frame at a point between the ends of the propeller shaft, said torque member having relative movement with said propeller shaft.

3. A torque arm, in a vehicle having a frame and a propeller shaft and a rear axle with its casing, comprising, in combination, a tubular torque member connected to the axle casing and arranged to protect the propeller shaft and a resilient connection between said member and the frame, said torque member having relative movement with said propeller shaft.

4. A torque arm, in a vehicle having a frame and a propeller shaft and a rear axle with its casing, comprising, in combination, a tubular torque member connected to the axle casing and arranged to protect the propeller shaft and a resilient connection between said member and the frame at a point between the ends of the propeller shaft, said propeller shaft being movable up and down relatively to said torque member.

5. A torque arm, in a vehicle having a frame and a propeller shaft and a rear axle with its casing, comprising, in combination, a tubular torque member connected to the axle casing and arranged to protect the propeller shaft, a bolt connecting said member and the frame between the ends of the propeller shaft, and a yielding device interposed between said member and the frame.

6. A torque arm, in a vehicle having a frame and a propeller shaft and a rear axle with its casing, comprising, in combination, a tubular torque member connected to the axle casing and arranged to protect the propeller shaft, a bolt connecting said member and the frame, and a yielding device interposed between said member and the frame, the bolt and said device being constructed and arranged to permit a limited universal movement of the tubular member with respect to the frame and said propeller shaft.

7. A torque arm, in a vehicle having a relatively movable frame and axle casing, comprising, in combination, a torque member centrally connected to the axle casing at one end, and a staybolt and resilient spacing device or washer connecting the opposite end of said member to the frame at a point directly above said shaft.

8. A torque arm, in a vehicle having a relatively movable frame and axle casing, comprising, in combination, a torque member centrally connected to the axle casing at one end, a stay bolt connecting the opposite end of the torque member to the frame, the staybolt having semi-spherical heads and the torque member and the frame having corresponding semi-spherical seats, and an interposed rubber washer having corresponding semi-spherical recesses in its opposite side faces.

9. A vehicle having a chassis frame including a member with a semi-spherical seat, a torque arm with a semi-spherical seat, a connecting bolt having at its ends semi-spherical heads in said seats, a rubber spacing member between the torque tube and the chassis frame member, and fabric gaskets or washers arranged to provide bearing surfaces for the heads of said connecting bolt.

10. A construction of the class described comprising, in combination, a frame, a propeller shaft, a rear axle with its casing, and a tubular torque arm protecting the shaft and clamped at its end to the casing, there being inter-fitting grooves in the tubular arm and a part of the casing and a clamp member seated in the grooves.

11. A construction of the class described comprising, in combination, a frame, a propeller shaft, a rear axle with its casing, and a tubular torque arm connected at one end to the casing, there being a boss on the axle casing having a pair of flanges, one of which is grooved, and two encircling clamps pressing the arm against the flanges, the arm being grooved to fit the grooved flange and the corresponding clamp having a portion seating directly in the groove in the flange.

12. A construction of the class described comprising, in combination, a frame, a propeller shaft, a rear axle with its casing, and a torque tube centrally connected to the casing and yieldingly connected to the frame between the ends of the propeller shaft, the tube being arranged to protect the propeller shaft and being open along its lower side to facilitate assembling the shaft and to permit relative movement of the shaft and tube.

In testimony whereof I affix my signature.

ORMOND E. HUNT.